US011620125B2

(12) United States Patent
Satoh et al.

(10) Patent No.: US 11,620,125 B2
(45) Date of Patent: Apr. 4, 2023

(54) SOFTWARE UPDATE DEVICE, SOFTWARE UPDATE METHOD, NON-TRANSITORY STORAGE MEDIUM, AND VEHICLE

(71) Applicant: TOYOTA JIDOSHA KABUSHIKI KAISHA, Toyota (JP)

(72) Inventors: Yusuke Satoh, Nisshin (JP); Satoru Fukuyo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 17/406,702

(22) Filed: Aug. 19, 2021

(65) Prior Publication Data

US 2022/0066771 A1   Mar. 3, 2022

(30) Foreign Application Priority Data

Aug. 31, 2020   (JP) .............................. JP2020-145977

(51) Int. Cl.
  *G06F 9/44*   (2018.01)
  *G06F 8/656*   (2018.01)
  *E05B 81/72*   (2014.01)
  *H04W 4/40*   (2018.01)

(52) U.S. Cl.
  CPC .............. *G06F 8/656* (2018.02); *E05B 81/72* (2013.01); *H04W 4/40* (2018.02)

(58) Field of Classification Search
  None
  See application file for complete search history.

(56) References Cited

U.S. PATENT DOCUMENTS

| | | | |
|---|---|---|---|
| 11,315,371 B2* | 4/2022 | Leiterer | .................... G06F 8/65 |
| 2005/0222726 A1* | 10/2005 | Furui | .................. B60R 16/0231 |
| | | | 701/1 |
| 2008/0032721 A1* | 2/2008 | MacDonald | .......... H04L 51/214 |
| | | | 455/466 |
| 2015/0301822 A1* | 10/2015 | Takahashi | ............. B60R 16/023 |
| | | | 717/173 |
| 2016/0148450 A1* | 5/2016 | Ohshima | ................ H04W 12/06 |
| | | | 340/5.61 |
| 2018/0144566 A1* | 5/2018 | Ohshima | ................ H04W 12/06 |
| 2019/0108010 A1* | 4/2019 | Tillman | .................. H04L 67/12 |
| 2019/0111907 A1* | 4/2019 | Harata | ..................... G06F 11/00 |
| 2022/0063556 A1* | 3/2022 | Neubauer | ........... G06F 12/1408 |
| 2022/0156057 A1* | 5/2022 | Kobayashi | ................ G06F 8/65 |

FOREIGN PATENT DOCUMENTS

| | | |
|---|---|---|
| EP | 2 602 157 A1 | 6/2013 |
| JP | 2006-143049 A | 6/2006 |
| JP | 2011-148398 A | 8/2011 |

* cited by examiner

*Primary Examiner* — Anna C Deng
(74) *Attorney, Agent, or Firm* — Oliff PLC

(57) ABSTRACT

A software update device connected to an in-vehicle network including a plurality of in-vehicle devices includes one or a plurality of processors configured to: perform an update of software of at least one of the in-vehicle devices; and perform a control of setting a door of a vehicle in an unlocked state before performing predetermined processing included in processing for the update, when performing the update.

6 Claims, 2 Drawing Sheets

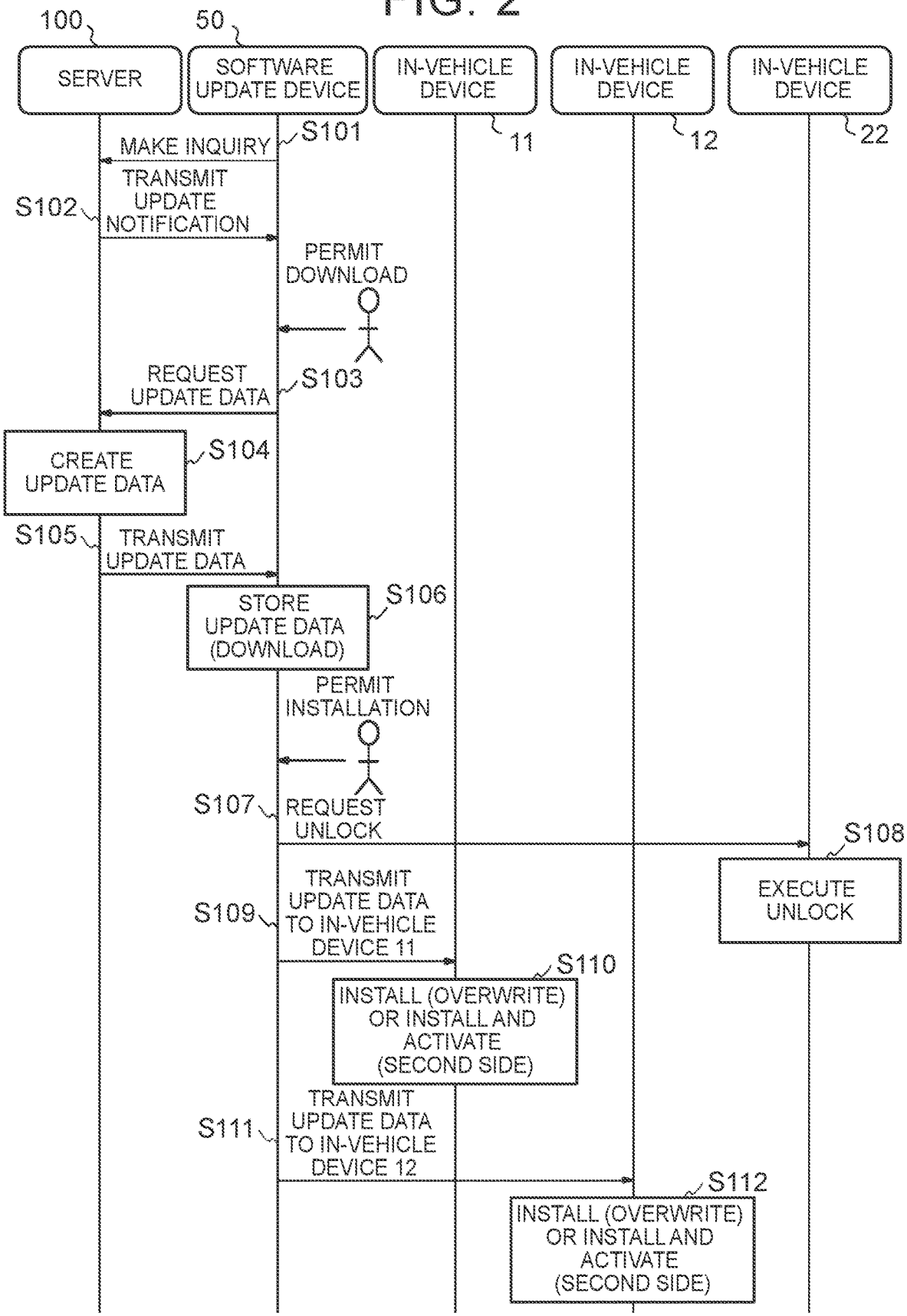

SOFTWARE UPDATE DEVICE, SOFTWARE UPDATE METHOD, NON-TRANSITORY STORAGE MEDIUM, AND VEHICLE

CROSS-REFERENCE TO RELATED APPLICATION

This application claims priority to Japanese Patent Application No. 2020-145977 filed on Aug. 31, 2020, incorporated herein by reference in its entirety.

BACKGROUND

1. Technical Field

The present disclosure relates to a software update device, a software update method, a non-transitory storage medium, and a vehicle.

2. Description of Related Art

A vehicle is equipped with a network system configured such that a plurality of in-vehicle devices called electronic control units (ECUs) is connected to each other via a communication line. Each of the in-vehicle devices transmits and receives a message to and from the other in-vehicle devices so as to share and execute functions of the vehicle.

The in-vehicle devices typically include one or a plurality of processors, and one or a plurality of transitory storage units such as random access memory (RAM) or one or a plurality of non-volatile storage units such as flash read-only memory (ROM). Software (a program) executed by the processor is stored in the non-volatile storage unit. Rewriting and updating of the software to a newer version makes it possible to upgrade and improve functions of the in-vehicle device.

Updating of the software involves a step of downloading in which update data is received from a server (a center) via a wireless communication, etc., and a step of installation in which update software is written in the storage unit of the in-vehicle device based on the downloaded update data. There are two types of installation of the software, that is, an overwriting installation and an other-bank installation, depending on the specification of the in-vehicle device. The overwriting installation is an installation in which the downloaded update software is written in one region (single bank) that is determined as a region for storing the software from the entire memory region of the storage unit by overwriting the current software (previous software). The other-bank installation is an installation in which, of two regions (double banks) that are determined as regions for storing the software, the downloaded update software is written into one of the regions (other-bank) that is not a region (one-bank) in which the current software (previous software) is stored. The two regions defined as regions for software storage may be, for example, regions included in each of the different banks (constituent units) of the same memory component, or each region of a different memory component such as a memory component of standard equipment and a memory component of extended equipment.

In the case of the other-bank installation, the step of updating software involves an activation step of activating the installed update software as the software to be executed, in addition to the steps of downloading and installation.

In relation to the software update of the ECU, Japanese Unexamined Patent Application Publication No. 2011-148398 (JP 2011-148398 A) discloses a technology that a specific ECU functions as a master ECU, communicates with a server, and updates the software of the master ECU and other ECUs.

SUMMARY

During the software update, for example, during the overwriting installation of the software, or during the activation of the software installed through the other-bank installation, the in-vehicle device cannot execute the software and thus cannot operate, which may restrict functions of the vehicle. In addition, if the update fails, there is a possibility that any part or all of the in-vehicle device cannot be operated thereafter and the functions of the vehicle become limited.

Therefore, in the case where a body control function that is one of the vehicle functions is restricted during software update or when the update fails, for example, there is a possibility that an inconvenience for a user, such as unlocking is not executed immediately even when the user on board unlocks the door, occurs.

The present disclosure provides a software update device in which occurrence of the inconvenience for the user can be avoided.

A software update device according to a first aspect of the present disclosure is connected to an in-vehicle network including a plurality of in-vehicle devices. The software update device includes one or a plurality of processors configured to: perform an update of software of at least one of the in-vehicle devices; and perform a control of setting a door of a vehicle in an unlocked state before performing predetermined processing included in processing for the update, when performing the update.

A software update method according to a second aspect of the present disclosure is executed by a computer of a software update device connected to an in-vehicle network including a plurality of in-vehicle devices. The software update method includes: performing a control to set a door of a vehicle in an unlocked state; and in an update of software of at least one of the in-vehicle devices, performing predetermined processing included in processing for the update while the door of the vehicle is in the unlocked state.

A non-transitory storage medium according to a third aspect of the present disclosure stores a software update program that is executable by a computer of a software update device connected to an in-vehicle network including a plurality of in-vehicle devices and that causes the computer to perform functions including: performing a control to set a door of a vehicle in an unlocked state; and in an update of software of at least one of the in-vehicle devices, performing predetermined processing included in processing for the update while the door of the vehicle is in the unlocked state.

A vehicle according to a fourth aspect of the present disclosure is provided with the software update device according to the first aspect.

According to the present disclosed technology, when updating the software, the software update device performs unlocking control of the door at a timing before a possibility arises that the function of the in-vehicle device is restricted, and the door is surely unlocked. Thus, the occurrence of the inconvenience for the user such as unlocking is not executed immediately during the software update or when the update fails can be avoided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a sequence diagram showing processing according to the embodiment.

DETAILED DESCRIPTION OF EMBODIMENTS

Configuration

Figure 1:
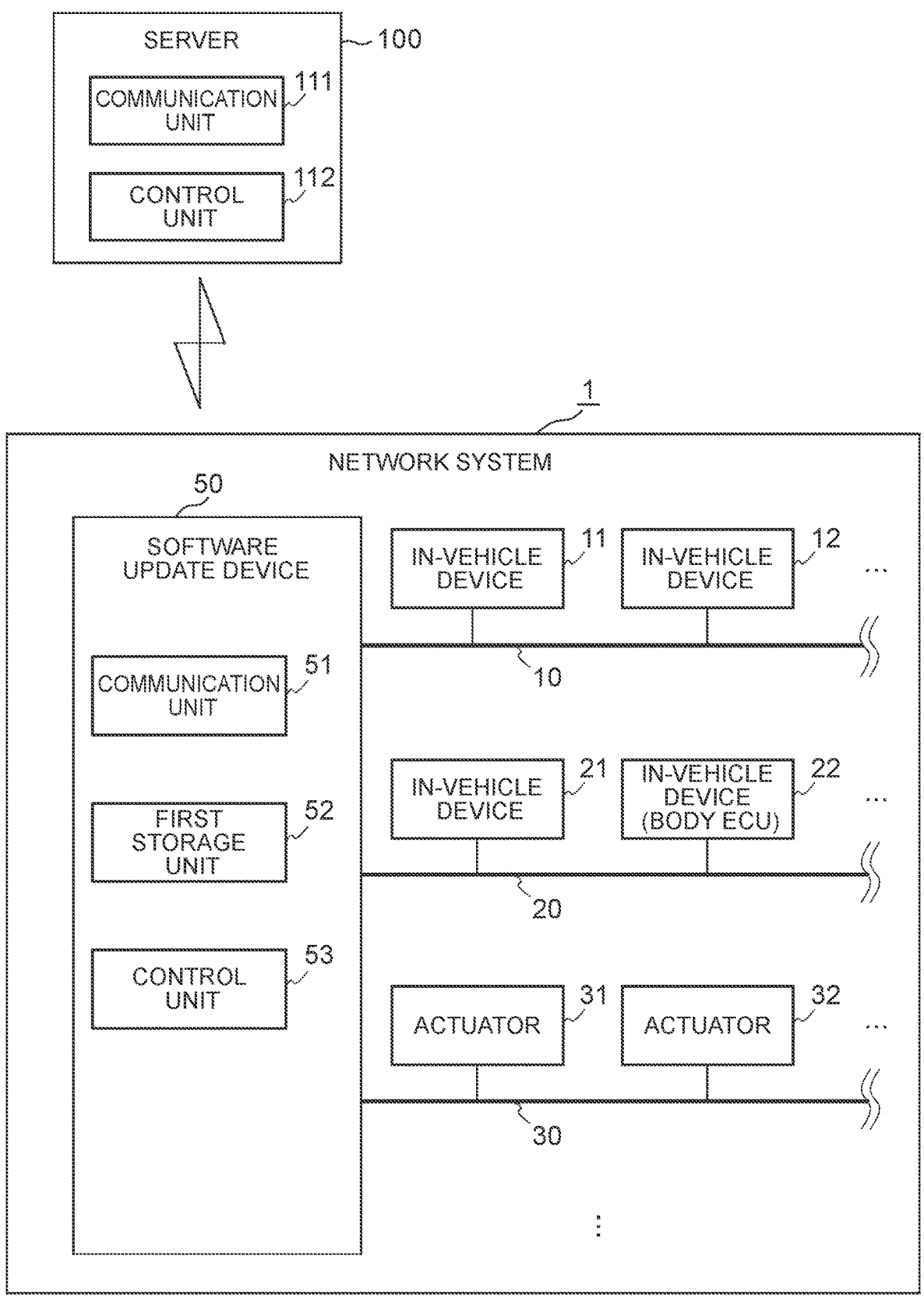
FIG. 1 is a configuration diagram of a network system according to an embodiment.

FIG. 1 shows a configuration example of a network system 1 according to an embodiment. The network system 1 is mounted on a vehicle. The network system 1 includes a software update device 50. A plurality of buses 10, 20, 30 . . . is connected to the software update device (over-the-air (OTA) master) 50. A plurality of in-vehicle devices (electronic control units) 11, 12 . . . is connected to the bus 10. A plurality of in-vehicle devices 21, 22 . . . is connected to the bus 20. A plurality of actuators 31, 32 . . . is connected to the bus 30. In FIG. 1 and the following description, the buses 10, 20, 30 are exemplified as the buses, the in-vehicle devices 11, 12, 21, 22 are exemplified as the in-vehicle devices, and the actuators 31, 32 are exemplified. However, the numbers of the buses, the in-vehicle devices, and the actuators are not limited. In addition, various sensors for acquiring the states of the vehicle and the surroundings of the vehicle are appropriately connected to the buses 10, 20, 30, or the in-vehicle devices 11, 12, 21, 22.

The software update device 50 includes a communication unit (communication module) 51 that is communicable with a server (center, external device) 100 installed outside the vehicle, a first storage unit (storage) 52 that stores various types of data, and a control unit 53.

The in-vehicle devices 11, 12, 21, 22 communicate with each other via a network and execute various types of processing for controlling the vehicle. Although illustration is omitted, the in-vehicle devices above include a non-volatile second storage unit (storage) such as a flash ROM, a control unit (processor, microcontroller) that executes various types of processing by reading software from the second storage unit and executing the software, and a transitory storage unit that stores a part of the storage and data, such as a RAM. Similarly, the software update device 50 also stores software (program) for the software update device 50 in the first storage unit 52, and the control unit 53 (processor, microcontroller) can execute a function of the software update device 50 by reading and executing the software. That is, the in-vehicle devices 11, 12, 21, 22 and the software update device 50 can be implemented as a computer including the one or a plurality of processors or the one or a plurality of microcontrollers.

In this example, the in-vehicle device 22 is an in-vehicle device called a body ECU, and controls the locking and unlocking of a door provided in the vehicle. The in-vehicle device 22 may further perform other controls such as lighting and air conditioning.

The control unit 53 of the software update device 50 controls and relays communication between the server 100 and the in-vehicle devices 11, 12, 21, 22, communication among the in-vehicle devices 11, 12, 21, 22, communication between the in-vehicle devices 11, 12, 21, 22 and the actuators 31, 32, via the buses 10, 20, 30. As described above, the software update device 50 also functions as a relay device that relays communication. Alternatively, the software update device 50 may be provided as a part of such a relay device, or may be provided separately from such a relay device by being connected to any of the buses 10, 20, 30.

The actuators 31, 32 are devices that generate mechanical actions with respect to the vehicle and components of the vehicle, such as a brake, an engine, or a power steering device, and operate based on commands from the in-vehicle devices 11, 12, 21, 22. The actuators 31, 32 may also include a computer configured of a processor, a microcontroller, memory, or the like.

The control unit 53 of the software update device 50 can update the software stored in the respective second storage units of the in-vehicle devices 11, 12, 21, 22. That is, the software update device 50 executes download control or installation control, or further executes activation control of the software. Downloading is processing to receive, from the server 100, the transmitted update data (distribution package) for updating the software in any of the in-vehicle devices 11, 12, 21, 22 and to store the update data. The download control may include, in addition to execution of downloading, control of a series of processing related to downloading, such as determination as to whether to execute downloading and verification of the update data. Installation is processing to write an update version of the software (update software) in the second storage unit of an update-target in-vehicle device of which software is a target of an update based on the downloaded update data. The installation control may include, in addition to execution of installation, control of a series of processing related to installation, such as determination as to whether to execute installation, transfer of the update data, and verification of the updated version of the software. Activation is processing of configuring, for example, a setting value of an execution start address of the software in order to activate the installed updated version of the software as the software to be executed. The activation control may include, in addition to execution of activation, control of a series of processing related to activation, such as determination as to whether to execute activation and verification of execution results.

In the installation control, when the update data includes the update software itself, the control unit 53 can transmit the update software to the in-vehicle device. When the update data includes compressed data, difference data, or divided data of the update software, the control unit 53 can generate the update software by decompressing or assembling the update data and transmit the update software to the in-vehicle device. Alternatively, the control unit 53 may transmit the update data to the in-vehicle device, and the in-vehicle device may generate the update software by decompressing or assembling the update data.

The control unit 53 may execute installation to write the update software to the second storage unit of the in-vehicle device, the in-vehicle device that has received a command from the control unit 53 may execute the installation, or the in-vehicle device that has received the update data (or the update software) may autonomously execute the installation without an explicit command from the control unit 53.

The control unit 53 may execute activation to activate the update software, the in-vehicle device that has received a command from the control unit 53 may execute the activation, or the in-vehicle device may autonomously execute the activation following the installation without an explicit command from the control unit 53.

Note that, the update processing of the software as described above can be executed continuously or in parallel with respect to the in-vehicle devices. The update data is data used for generating the update software. The content and format of the update data are not limited. For example, the update data includes the update software itself, difference data for generating the update software, or compressed data or divided data of the update software, etc., as described above. Further, the update data may include an identifier (ECU ID) of the update-target in-vehicle device (target electronic control unit) of which software is the target of the update and an identifier (ECU software ID) of the version of the software before the update.

The server 100 is, for example, a computer device such as a server, etc. installed in a specific center or the like, and can transmit each update data for updating the software of the in-vehicle device of each vehicle to each of a plurality of vehicles. The server 100 includes a communication unit (communication module) 111 that communicates with the software update device 50 and a control unit 112 that controls the communication unit 111. The function of the control unit 112 is executed by a processor, a microcontroller, or the like. Further, the server 100 includes a storage unit (not shown), and can receive and store data for updating software of each of the in-vehicle devices from the outside.

Processing

The details of the software update processing according to the embodiment will be described below. FIG. 2 shows a sequence diagram showing an example of this processing. The processing typically begins in a state in which a power source of the vehicle is turned on (ignition on, power on).

Step S101

The control unit 53 of the software update device 50 controls the communication unit 51 to make an inquiry to the server 100 of the presence or absence of update software.

Step S102

When the communication unit 111 of the server 100 receives the inquiry, the control unit 112 controls the communication unit 111 to transmit a notification that there is an update to the software update device 50 when there is the update software. For example, based on information indicating the types of the in-vehicle devices included in the network system 1 and the current software version, the control unit 112 can determine the presence or absence of updated software, which is an updated version of the software for these in-vehicle devices. Such information may be stored in advance by the server 100, or may be received from the software update device 50 together with an inquiry. The control unit 112 controls the communication unit 111 to transmit a notification that there no update to the software update device 50 when there is no update software.

Step S103

When the communication unit 51 of the software update device 50 receives the notification that there is an update, the control unit 53 displays a request asking permission to download the update data on a human machine interface (HMI) device that is one of the in-vehicle devices. When the user performs an operation of giving permission to the HMI device, the control unit 53 controls the communication unit 51 and requests the server 100 for the update data.

Step S104

When the communication unit 111 of the server 100 receives the update data request, the control unit 112 of the server 100 generates the update data to be transmitted to the vehicle based on the update software provided to the server 100. The update data includes data for updating the software of one or more update-target in-vehicle devices (target electronic control units) of which software is the target of the update.

Step S105

The control unit 112 of the server 100 controls the communication unit 111 to transmit the update data.

Step S106

The communication unit 51 of the software update device 50 receives the update data, and the control unit 53 stores (downloads) the update data in the first storage unit 52.

Step S107

The control unit 53 of the software update device 50 displays a request asking permission to perform installation, on the human machine interface (HMI) device. When the user performs an operation giving permission to the HMI device, the control unit 53 transmits a request to unlock the door to the in-vehicle device 22 that is a body ECU. Alternatively, the control unit 53 may make an inquiry to the in-vehicle device 22 whether the door is locked, and transmit a request to unlock the door when the door is locked.

Step S108

When the in-vehicle device 22 receives the request for unlocking the door, the in-vehicle device 22 unlocks the door in response to the request. When the door is already unlocked, the in-vehicle device 22 maintains the unlocked state.

Step S109

The control unit 53 of the software update device starts the processing of installation or installation and activation. Here, as an example, the in-vehicle device 11 is included in the update-target in-vehicle devices in which software is the target of the update, and the control unit 53 transmits the data for updating the software of the in-vehicle device 11 included in the update data received from the server 100 to the in-vehicle device 11.

Step S110

When the in-vehicle device 11 receives the data, the in-vehicle device 11 updates the software based on the received data. That is, when the in-vehicle device 11 is a type that performs the overwriting installation, the in-vehicle device 11 performs the overwriting installation described above. When the in-vehicle device 11 is a type that performs the other-bank installation described above, the in-vehicle device 11 performs the above-described other-bank installation and activation in this order.

Step S111

When there is data that is not yet transmitted to the update-target in-vehicle device among the data for updating the software of each in-vehicle device included in the update data received from the server 100, the control unit 53 of the software update device 50 controls the communication unit 51 and transmits the data to the update-target in-vehicle device. Here, as an example, the in-vehicle device 12 is included in the update-target in-vehicle devices in which software is the target of the update, and the control unit 53 transmits the data for updating the software of the in-vehicle device 12 to the in-vehicle device 12.

Step S112

When the in-vehicle device 12 receives the data, the in-vehicle device 12 performs the overwriting installation or the other-bank installation and activation of the software based on the received data in the same manner as in the in-vehicle device 11 in step S110.

The above example is an example of when the update data received from the server 100 includes the data for updating the software of the in-vehicle devices 11, 12. However, the software of other in-vehicle devices including the body ECU can be updated in the same manner. Further, the number of update-target in-vehicle devices is not limited to two, and may be one, three, or more. Further, as described above, the data transmitted from the software update device 50 to each in-vehicle device in steps S109, S111 may be substantially the update software itself, the compressed data of the update software, the difference data from the software before the update, or the like.

The above-mentioned in-vehicle device of the type in which the other-bank installation described above is performed may perform installation without the permission of the user. In this case, after installation, the activation permission is accepted from the user, and the software update device 50 activates the in-vehicle device when the permission is received. When the type of all of the update-target in-vehicle devices in which the software is the target of the update are the type in which the other-bank installation is performed, the software update device 50 may make an unlock request after installation and before activation. In this way, the timing of unlocking the door can be appropriately set in a sequence of software update processing based on the type configuration of the in-vehicle device, as long as the timing is before the execution timing of predetermined processing in which there is a possibility that the function of the in-vehicle device is limited, such as before the overwriting installation of the update software or before the activation of the update software installed through the other-bank installation.

Effect

In the present embodiment, when updating the software, the software update device performs unlocking control of the door at a timing before a possibility arises that the function of the in-vehicle device is restricted, and the door is surely unlocked. Thus, the occurrence of the inconvenience for the user such as unlocking is not executed immediately during the software update or when the update fails can be avoided.

The disclosed technology can be interpreted as a software update device, a network system including the software update device, a system including the software update device and a body ECU, a method executed by a computer included in the software update device, a program and a computer-readable non-transitory storage medium that stores the program, and a vehicle provided with the software update device, etc.

The disclosed technology is useful for network systems mounted on vehicles, etc.

A software update device according to an aspect of the present disclosure is connected to an in-vehicle network including a plurality of in-vehicle devices. The software update device includes one or a plurality of processors configured to: perform an update of software of at least one of the in-vehicle devices; and perform a control of setting a door of a vehicle in an unlocked state before performing predetermined processing included in processing for the update, when performing the update.

A software update method according to another aspect of the present disclosure is executed by a computer of a software update device connected to an in-vehicle network including a plurality of in-vehicle devices. The software update method includes: performing a control to set a door of a vehicle in an unlocked state; and in an update of software of at least one of the in-vehicle devices, performing predetermined processing included in processing for the update while the door of the vehicle is in the unlocked state.

A non-transitory storage medium according to another aspect of the present disclosure stores a software update program that is executable by a computer of a software update device connected to an in-vehicle network including a plurality of in-vehicle devices and that causes the computer to perform functions including: performing a control to set a door of a vehicle in an unlocked state; and in an update of software of at least one of the in-vehicle devices, performing predetermined processing included in processing for the update while the door of the vehicle is in the unlocked state.

A vehicle according to another aspect of the present disclosure is provided with the software update device according to the above aspect.

An OTA master according to another aspect of the present disclosure is connected to an in-vehicle network including a plurality of electronic control units. The OTA master includes one or a plurality of processors configured to: perform an update of software of at least one of the electronic control units; and perform a control of setting a door of a vehicle in an unlocked state before installation or before activation, when performing the update.

A software update method according to another aspect of the present disclosure is executed by a computer of an OTA master connected to an in-vehicle network including a plurality of electronic control units. The software update method includes: performing a control to set a door of a vehicle in an unlocked state; and in an update of software of at least one of the electronic control units, performing at least either installation or activation while the door of the vehicle is in the unlocked state.

A non-transitory storage medium according to another aspect of the present disclosure stores a software update program that is executable by a computer of an OTA master connected to an in-vehicle network including a plurality of electronic control units and that cause the computer to perform functions including: performing a control to set a door of a vehicle in an unlocked state; and in an update of software of at least one of the electronic control units, performing at least either installation or activation while the door of the vehicle is in the unlocked state.

What is claimed is:

1. A software update device connected to an in-vehicle network including a plurality of in-vehicle devices, the software update device comprising one or a plurality of processors configured to:
    perform an update of software of at least one of the plurality of in-vehicle devices; and
    perform a control of setting a door of a vehicle in an unlocked state before performing predetermined processing included in processing for the update, when performing the update;
    wherein the predetermined processing includes processing of activating update software as software to be executed, after update software is written in a region other than a storage region of storing software before the update, in a storage device of an in-vehicle device that is a target of the update, among the plurality of in-vehicle devices.

2. The software update device according to claim 1, wherein the predetermined processing includes processing of overwriting update software in a storage region of storing a program before the update, in the storage device of the at least one in-vehicle device that is the target of the update, among the plurality of in-vehicle devices.

3. The software update device according to claim 1, wherein the processing for the update is executed based on an approval from a user.

4. A vehicle comprising the software update device according to claim 1.

5. A software update method executed by a computer of a software update device connected to an in-vehicle network including a plurality of in-vehicle devices, the software update method comprising:

performing a control to set a door of a vehicle in an unlocked state; and in an update of software of at least one of the plurality of in-vehicle devices in the vehicle, performing predetermined processing included in processing for the update while the door of the vehicle is in the unlocked state;

wherein the predetermined processing includes processing of activating update software as software to be executed, after update software is written in a region other than a storage region of storing software before the update, in a storage device of an in-vehicle device that is a target of the update, among the plurality of in-vehicle devices.

6. A non-transitory storage medium storing a software update program that is executable by a computer of a software update device connected to an in-vehicle network including a plurality of in-vehicle devices and that causes the computer to perform functions comprising:

performing a control to set a door of a vehicle in an unlocked state; and in an update of software of at least one of the plurality of in-vehicle devices in the vehicle, performing predetermined processing included in processing for the update while the door of the vehicle is in the unlocked state;

wherein the predetermined processing includes processing of activating update software as software to be executed, after update software is written in a region other than a storage region of storing software before the update, in a storage device of an in-vehicle device that is a target of the update, among the plurality of in-vehicle devices.

* * * * *